(12) United States Patent
Milburn et al.

(10) Patent No.: US 12,248,564 B2
(45) Date of Patent: Mar. 11, 2025

(54) SYSTEMS AND METHODS FOR TRANSFORMING INSTRUCTIONS FOR METADATA PROCESSING

(71) Applicant: Dover Microsystems, Inc., Wayland, MA (US)

(72) Inventors: Steven Milburn, Cranston, RI (US); Eli Boling, Manchester, MA (US)

(73) Assignee: Dover Microsystems, Inc., Wayland, MA (US)

( * ) Notice: Subject to any disclaimer, the term of this patent is extended or adjusted under 35 U.S.C. 154(b) by 0 days.

(21) Appl. No.: 18/625,085

(22) Filed: Apr. 2, 2024

(65) Prior Publication Data
US 2024/0394362 A1 Nov. 28, 2024

Related U.S. Application Data

(63) Continuation of application No. 16/966,863, filed as application No. PCT/US2019/016276 on Feb. 1, 2019.
(Continued)

(51) Int. Cl.
*G06F 21/54* (2013.01)
*G06F 9/30* (2018.01)
(Continued)

(52) U.S. Cl.
CPC .......... *G06F 21/54* (2013.01); *G06F 9/30058* (2013.01); *G06F 9/30101* (2013.01);
(Continued)

(58) Field of Classification Search
CPC .. G06F 21/54; G06F 9/30058; G06F 9/30101; G06F 9/3017; G06F 9/38;
(Continued)

(56) References Cited

U.S. PATENT DOCUMENTS 5,201,056 A   4/1993 Daniel et al.
5,377,336 A   12/1994 Eickemeyer et al.
(Continued)

FOREIGN PATENT DOCUMENTS

CN   101558388 A   10/2009
CN   102160033 A   8/2011
(Continued)

OTHER PUBLICATIONS

Michael Dalton, Hari Kannan, Christos Kozyrakis; Raksha: A Flexible Information Flow Architecture for Software Security; ISCA'07, Jun. 9-13, 2007, San Diego, California, USA (Year: 2007).*
(Continued)

*Primary Examiner* — Amie C. Lin.
(74) *Attorney, Agent, or Firm* — Wolf, Greenfield & Sacks, P.C.

(57) ABSTRACT

According to at least one aspect, a hardware system include a host processor, a policy engine, and an interlock is provided. These components can interoperate to enforce security policies. The host processor can execute an instruction and provide instruction information to the policy engine and the result of the executed instruction to the interlock. The policy engine can determine whether the executed instruction is allowable according to one or more security policies using the instruction information. The interlock can buffer the result of the executed instruction until an indication is received from the policy engine that the instruction was allowable. The interlock can then release the result of the executed instruction. The policy engine can be configured to transform instructions received from the host processor or add inserted instructions to the policy evaluation pipeline to increase the flexibility of the policy engine and enable enforcement of the security policies.

19 Claims, 7 Drawing Sheets

Related U.S. Application Data

(60) Provisional application No. 62/625,746, filed on Feb. 2, 2018, provisional application No. 62/625,802, filed on Feb. 2, 2018, provisional application No. 62/635,319, filed on Feb. 26, 2018.

(51) Int. Cl.
  *G06F 9/38* (2018.01)
  *G06F 21/12* (2013.01)

(52) U.S. Cl.
  CPC .......... *G06F 9/3017* (2013.01); *G06F 9/3806* (2013.01); *G06F 21/121* (2013.01)

(58) Field of Classification Search
  CPC ...... G06F 21/121; G06F 9/38585; G06F 8/52; G06F 9/3861; G06F 9/45516; G06F 21/52
  See application file for complete search history.

(56) References Cited

U.S. PATENT DOCUMENTS

| | | |
|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,127,626 B1 * | 11/2018 | Ostby .................. G06T 1/20 |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |

(56) References Cited

U.S. PATENT DOCUMENTS

| | | |
|---|---|---|
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2005/0183094 A1 | 8/2005 | Hunt |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0229156 A1 | 9/2008 | Alexander et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067151 A1 | 3/2013 | Lasser et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0173392 A1 | 6/2014 | Drake |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |

(56) References Cited

U.S. PATENT DOCUMENTS

| | | |
|---|---|---|
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1* | 6/2017 | DeHon ............... G06F 12/1408 |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0357497 A9 | 11/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A2 | 6/2017 |
| WO | WO 2017/106103 A1 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

Michael Dalton, Hari Kannan, Christos Kozyrakis; Real-World Buffer Overflow Protection for Userspace & Kernelspace; Proceedings of the 17th USENIX Security Symposium (UsenixSec), Jul. 2008 (Year: 2008).*
U.S. Appl. No. 15/168,689, filed May 31, 2016, DeHon et al.
U.S. Appl. No. 15/426,098, filed Feb. 7, 2017, DeHon.
U.S. Appl. No. 15/624,878, filed Jun. 16, 2017, DeHon et al.
U.S. Appl. No. 15/695,541, filed Sep. 5, 2017, DeHon.
U.S. Appl. No. 16/002,642, filed Jun. 7, 2018, DeHon et al.
U.S. Appl. No. 16/002,757, filed Jun. 7, 2018, DeHon et al.
U.S. Appl. No. 16/002,957, filed Jun. 7, 2018, DeHon.
U.S. Appl. No. 16/002,987, filed Jun. 7, 2018, DeHon.
U.S. Appl. No. 16/062,791, filed Jun. 15, 2018, DeHon et al.
U.S. Appl. No. 16/062,796, filed Jun. 15, 2018, DeHon et al.

(56) References Cited

OTHER PUBLICATIONS

U.S. Appl. No. 16/256,640, filed Jan. 24, 2019, DeHon et al.
U.S. Appl. No. 16/264,773, filed Feb. 1, 2019, Milburn et al.
U.S. Appl. No. 16/684,172, filed Nov. 14, 2019, DeHon.
U.S. Appl. No. 16/905,680, filed Jun. 18, 2020, DeHon.
U.S. Appl. No. 16/929,692, filed Jul. 15, 2020, DeHon.
U.S. Appl. No. 16/966,616, filed Jul. 31, 2020, Boling et al.
U.S. Appl. No. 16/966,863, filed Jul. 31, 2020, Milburn et al.
U.S. Appl. No. 16/966,865, filed Jul. 31, 2020, Milburn et al.
U.S. Appl. No. 16/966,866, filed Jul. 31, 2020, Boling et al.
U.S. Appl. No. 17/051,741, filed Oct. 29, 2020, Sutherland et al.
U.S. Appl. No. 17/292,694, filed May 10, 2021, Boling et al.
U.S. Appl. No. 17/308,868, filed May 5, 2021, Milburn et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 17/452,271, filed Oct. 26, 2021, DeHon.
U.S. Appl. No. 17/474,830, filed Sep. 14, 2021, Milburn et al.
U.S. Appl. No. 17/507,398, filed Oct. 21, 2021, Milburn et al.
U.S. Appl. No. 17/560,975, filed Dec. 23, 2021, Boling et al.
U.S. Appl. No. 17/711,092, filed Apr. 1, 2022, Boling et al.
U.S. Appl. No. 17/720,035, filed Apr. 13, 2022, Boling et al.
U.S. Appl. No. 17/769,868, filed Apr. 18, 2022, Boling et al.
U.S. Appl. No. 17/774,799, filed May 5, 2022, Sutherland et al.
U.S. Appl. No. 17/880,539, filed Aug. 3, 2022, Milburn et al.
U.S. Appl. No. 17/908,879, filed Sep. 1, 2022, Milburn et al.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Search Report and Written Opinion for International Application No. PCT/US2019/016276 mailed Apr. 26, 2019.
International Preliminary Report on Patentability for International Application No. PCT/US2019/016276 mailed Aug. 13, 2020.
International Search Report and Written Opinion for International Application No. PCT/US2019/029880 mailed Aug. 8, 2019.
International Preliminary Report on Patentability for International Application No. PCT/US2019/029880 mailed Nov. 12, 2020.
International Search Report and Written Opinion for International Application No. PCT/US2019/016317 mailed Apr. 16, 2019.
International Preliminary Report on Patentability for International Application No. PCT/US2019/016317 mailed Aug. 13, 2020.
International Search Report and Written Opinion for International Application No. PCT/US2020/059057 mailed Feb. 8, 2021.
International Preliminary Report on Patentability for International Application No. PCT/US2020/059057, mailed May 19, 2022.
International Search Report and Written Opinion for International Application No. PCT/US2016/066188 mailed Jul. 13, 2017.
International Search Report and Written Opinion for International Application No. PCT/US2016/066194 mailed Apr. 7, 2017.
International Search Report and Written Opinion for International Application No. PCT/US2019/016242 mailed Mar. 29, 2019.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
Invitation to Pay Additional Fees for International Application No. PCT/US2019/013678 mailed Apr. 15, 2020.
International Search Report and Written Opinion for International Application No. PCT/US2019/013678 mailed Jun. 23, 2020.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2021/020602 mailed May 11, 2021.
International Preliminary Report on Patentability for International Application No. PCT/US2021/020602, mailed Sep. 15, 2022.
International Search Report and Written Opinion for International Application No. PCT/US2020/055952 mailed Jan. 28, 2021.
International Preliminary Report on Patentability for International Application No. PCT/US2020/055952 mailed Apr. 28, 2022.
International Search Report and Written Opinion for International Application No. PCT/US2019/060028 mailed Mar. 23, 2020.
International Preliminary Report on Patentability for International Application No. PCT/US2019/060028 mailed May 20, 2021.
International Search Report and Written Opinion for International Application No. PCT/US2022/042492 mailed Jan. 11, 2023.
[No Author Listed] Arm Limited: AMBA® AXI® and ACE® Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34th Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., Dover A Metadata-Extended RISC-V. Jan. 6, 2016:34. [https://web.archive.org/web/20160331131339_if_/http://riscv.org/wp-content/uploads/2016/01/Wed1430-dover riscv jan2016 v3.pdf].
Dehon et al., Dover: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., Pump: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hriţcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.

(56) References Cited

OTHER PUBLICATIONS

Mambretti et al., Trellis: Privilege separation for multi-user applications made easy. International Symposium on Research in Attacks, Intrusions, and Defenses. Springer, Cham. Sep. 19, 2016:437-56.

Mutlu, 18-447 Computer Architecture Lecture 11: Precise Exceptions, State Maintenance, State Recovery. Carnegie Mellon University Lecture. Feb. 11, 2015, 49 pages.

Nagarakatte et al., SoftBound: Highly Compatible and Complete Spatial Memory Safety for C. University of Pennsylvania Department of Computer and Information Science Technical Report. Jan. 2009. 12 pages.

Okhravi et al., One Giant Leap for Computer Security. IEEE Computer and Reliability Societies. Jul./Aug. 2020;18(4):8-19.

Ozsoy et al., SIFT: A low-overhead dynamic information flow tracking architecture for smt processors. Proceedings of the 8th ACM International Conference on Computing Frontiers. May 3, 2011:1-11.

Roessler et al., Protecting the stack with metadata policies and tagged hardware. 2018 IEEE Symposium on Security and Privacy (SP) May 20, 2018;478-95.

Song et al., Security tagging for a zero-kernel operating system. 2013 46th Hawaii International Conference on System Sciences Jan. 7, 2013:5049-58.

Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].

Suh et al., Secure Program Execution via Dynamic Information Flow Tracking. MIT CSAIL. Jul. 2003. 14 pages.

Sullivan et al., The dover inherently secure processor. 2017 IEEE International Symposium on Technologies for Homeland Security (HST) Apr. 25, 2017:1-5.

Tiwari et al., A small cache of large ranges: Hardware methods for efficiently searching, storing, and updating big dataflow tags. 2008 41st IEEE/ACM International Symposium on Microarchitecture Nov. 8, 2008:94-105.

Tiwari et al., Complete information flow tracking from the gates up. InProceedings of the 14th international conference on Architectural support for programming languages and operating systems Mar. 7, 2009;109-20.

Waterman et al., The RISC-V Instruction Set Manual, vol. I: Unprivileged ISA, Document Version Dec. 13, 2019. RISC-V Foundation. Dec. 2019. 238 pages.

Watson et al., Cheri: A hybrid capability-system architecture for scalable software compartmentalization. 2015 IEEE Symposium on Security and Privacy Sep. 2015;20-37.

Witchel et al., Mondrian Memory Protection. ASPLOS-X. 2002;13 pages.

Woodruff, Cheri: A RISC capability machine for practical memory safety. University of Cambridge, Computer Laboratory; 2014. 112 pages.

Zeldovich et al., Hardware Enforcement of Application Security Policies Using Tagged Memory. USENIX Symposium on Operating Systems Design and Implementation. Dec. 8, 2008:8;225-40.

PCT/US2019/060698, Mar. 2, 2020, International Search Report and Written Opinion.

* cited by examiner

SYSTEMS AND METHODS FOR TRANSFORMING INSTRUCTIONS FOR METADATA PROCESSING

RELATED APPLICATIONS

This application is a continuation of U.S. application Ser. No. 16/966,863, filed Jul. 31, 2020, entitled "SYSTEMS AND METHODS FOR TRANSFORMING INSTRUCTIONS FOR METADATA PROCESSING", which is a national stage filing under 35 U.S.C. § 371 of International Patent Application Serial No. PCT/US2019/016276, filed Feb. 1, 2019, which claims priority to U.S. Provisional Patent Application Ser. No. 62/635,319, filed on Feb. 26, 2018, titled "SYSTEMS AND METHODS FOR TRANSFORMING INSTRUCTIONS FOR METADATA PROCESSING", U.S. Provisional Patent Application Ser. No. 62/625,746, filed on Feb. 2, 2018, titled "SYSTEMS AND METHODS FOR TRANSLATING BETWEEN INSTRUCTION SET ARCHITECTURES", and U.S. Provisional Patent Application Ser. No. 62/625,802, filed on Feb. 2, 2018, titled "SYSTEMS AND METHODS FOR SECURING INTERRUPT SERVICE ROUTINE ENTRY.".

The above National Stage application was filed on the same day as:

The national stage filing under 35 U.S.C. § 371 of International Patent Application Serial No. PCT/US2019/016272, filed Feb. 1, 2019, titled "SYSTEMS AND METHODS FOR SECURE INITIALIZATION," claiming the benefit under 35 U.S.C. § 119 (e) of U.S. Provisional Patent Application Ser. No. 62/625,822, filed on Feb. 2, 2018, titled "SYSTEMS AND METHODS FOR SECURE INITIALIZATION", and U.S. Provisional Patent Application Ser. No. 62/635,289, filed on Feb. 26, 2018, titled "SYSTEMS AND METHODS FOR SECURE INITIALIZATION"; and The national stage filing under 35 U.S.C. § 371 of International Patent Application Serial No. PCT/US2019/016317, filed Feb. 1, 2019, titled "SYSTEMS AND METHODS FOR POST CACHE INTERLOCKING", claiming the benefit under 35 U.S.C. § 119 (e) of U.S. Provisional Patent Application Ser. No. 62/625,770, titled "SYSTEMS AND METHODS FOR POST CACHE INTERLOCKING," filed on Feb. 2, 2018, and Provisional Patent Application Ser. No. 62/635,475, titled "SYSTEMS AND METHODS FOR POST CACHE INTERLOCKING," filed on Feb. 26, 2018.

Each of the above-referenced applications is hereby incorporated by reference in its entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals race to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

According to at least one aspect, a method is provided. The method comprises the acts of: receiving first instruction information associated with a first instruction; accessing a first data structure associated with the first instruction; determining, based at least in part on the first data structure, whether to perform first processing or second processing; in response to determining that the first processing is to be performed, performing the first processing, comprising: identifying first metadata from the first data structure associated with the first instruction; and outputting the first instruction information along with the first metadata; in response to determining that the second processing is to be performed, performing the second processing, comprising: identifying location information from the first data structure associated with the first instruction; using the location information to access at least one second data structure; identifying, from the at least one second data structure, second instruction information associated with at least one second instruction and corresponding second metadata; and outputting the second instruction information along with the corresponding second metadata.

In some embodiments, the at least one second instruction comprises a plurality of second instructions; and the second metadata comprises a plurality of pieces of second metadata corresponding, respectively to the plurality of second instructions.

In some embodiments, the act of receiving the first instruction information comprises: receiving the first instruction information from a hardware translator programmed to translate instruction information in an input instruction set architecture (ISA) to instruction information in an output ISA; and the first instruction information is in the output ISA.

In some embodiments, the method further comprises acts of: receiving third instruction information from a host processor, the third instruction information being in the input ISA; and translating, by the hardware translator, the third instruction information into the first instruction information, which is in the output ISA.

In some embodiments, the act of receiving the first instruction information comprises retrieving the first instruction information from a memory location, and the method further comprises acts of: translating, by a software translator, third instruction information in an input instruction set architecture (ISA) into the first instruction information, wherein the first instruction information is in an output ISA; and storing, by the software translator, the first instruction information at the memory location.

In some embodiments, the act of accessing a first data structure comprises: accessing the first data structure from an entry in a tag map table, the entry being associated with the first instruction.

In some embodiments, the act of accessing a first data structure comprises: accessing a pointer from an entry in a tag map table, the entry being associated with the first instruction; and using the pointer to access the first data structure from a metadata memory.

In some embodiments, the method further comprises an act of: identifying a flag from the first data structure associated with the first instruction.

In some embodiments, determining whether to perform first processing or second processing based at least in part on the first data structure comprises: determining whether to perform first processing or second processing based at least in part on the flag.

In some embodiments, the first instruction is a first branch instruction in an instruction path comprising the first branch instruction that starts the instruction path, a second branch instruction that ends the instruction path, and at least one intermediate instruction between the first branch instruction and the second branch instruction.

In some embodiments, the at least one second instruction performs a same set operations as the instruction path.

In some embodiments, the method further comprises acts of: identifying a set of one or more operations that are performed by the instruction path that comprises a smaller number of operations than instructions in the instruction path; and generating the second instruction information associated with the at least one second instruction based on the set of one or more operations.

According to at least one aspect, a method is provided. The method comprises receiving first instruction information associated with a first instruction in a first instruction set architecture (ISA); obtaining second instruction information associated with at least one second instruction that corresponds to the first instruction and is in a second ISA that is different from the first ISA, wherein the act of obtaining the second instruction information is performed using a set of relationships between a first plurality of instructions in the first ISA including the first instruction and a second plurality of instructions in the second ISA including the at least one second instruction, wherein the set of relationships comprises a relationship between a single instruction in the first plurality of instructions that maps to a set of two or more instructions in the second plurality of instructions; identifying metadata associated with the at least one second instruction; determining whether the first instruction violates at least one rule using the metadata associated with the at least one second instruction; and responsive to the first instruction violating the at least one rule, outputting an indication that the first instruction violates the at least one rule.

According to at least one aspect, a method is provided. The method comprises receiving, using tag processing hardware, instruction information associated with an instruction that is a first instruction after a context change; associating, using the tag processing hardware, metadata with the received instruction information, wherein the metadata comprises an indication that the received instruction information is associated with the first instruction after the context change; triggering, using the tag processing hardware, a policy processor to read the metadata associated with the received instruction information; and modifying, at least in part using the policy processor, at least some metadata associated with a first storage location and at least some metadata associated with a second, different storage location responsive to reading the metadata associated with the received instruction.

In some embodiments, receiving the instruction information comprises: receiving instruction information associated with an instruction that is a first instruction in an interrupt service routine (ISR).

In some embodiments, the first storage location is a storage location of an interrupt programmable counter value when the host processor is not executing the ISR and wherein the second storage location is a storage location of the interrupt programmable counter value when the host processor is executing the ISR.

According to at least one aspect, a policy engine is provided. The policy engine can include at least one of tag processing hardware or a policy processor. The at least one of tag processing hardware or a policy processor can be configured to perform a set of operations. The operations can include receiving first instruction information associated with at least one first instruction executed by a host processor.

The operations can include transforming the first instruction information into second instruction information associated with at least one second instruction. The operations can include determining the at least one first instruction is allowable according to a policy using second metadata corresponding to the at least one second instruction. The operations can further include providing, to an interlock, an indication to provide a queued result of executing the at least one first instruction.

According to at least one aspect, another system is provided. This system can include a policy engine. The policy engine can be configured to perform a set of operations. The operations can include receiving first instruction information associated with at least one first instruction executed by a host processor. The operations can further include, in response to receiving the first instruction information, obtaining second instruction information associated with at least one second instruction and second metadata associated with the second instruction. The operations can also include generating update metadata using at least one of the second instruction information and second metadata. The operations can further include updating at least one of a tag map table, tag register file, or metadata memory using the generated update metadata. The operations can also include determining at least one instruction previously executed by a host processor is allowable according to at least one policy, the determination based on the updated at least one of the tag map table, tag register file, or metadata memory. The operations can additionally include providing, to an interlock in response to the determination, an indication to release a queued result of executing the at least one first instruction.

According to at least one aspect, a further system is provided. This system can include a policy engine. The policy engine can be configured to perform a set of operations. The operations can include receiving instruction information associated with a first instruction in a host Instruction Set Architecture (ISA) executed by a host processor. The operations can also include generating a translation of the instruction information, the translation not in the host ISA. The operations can additionally include obtaining metadata using the translation of the instruction information. The operations can also include determining the at least one first instruction is allowable according to a policy using the metadata. The operations can further include providing, to an interlock, an indication to release a queued result of executing the at least one first instruction.

According to at least one aspect, a further system is provided. This system can include a policy engine. The policy engine can be configured to perform a set of operations. The operations can include receiving instruction information associated with a first instruction in a host Instruction Set Architecture (ISA) used by a host processor. The operations can further include generating a translation of the instruction information, the translation not in the host ISA. The operations can also include obtaining metadata using an address of the first instruction; and determining, using the metadata, whether the at least one first instruction is allowable according to a policy.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
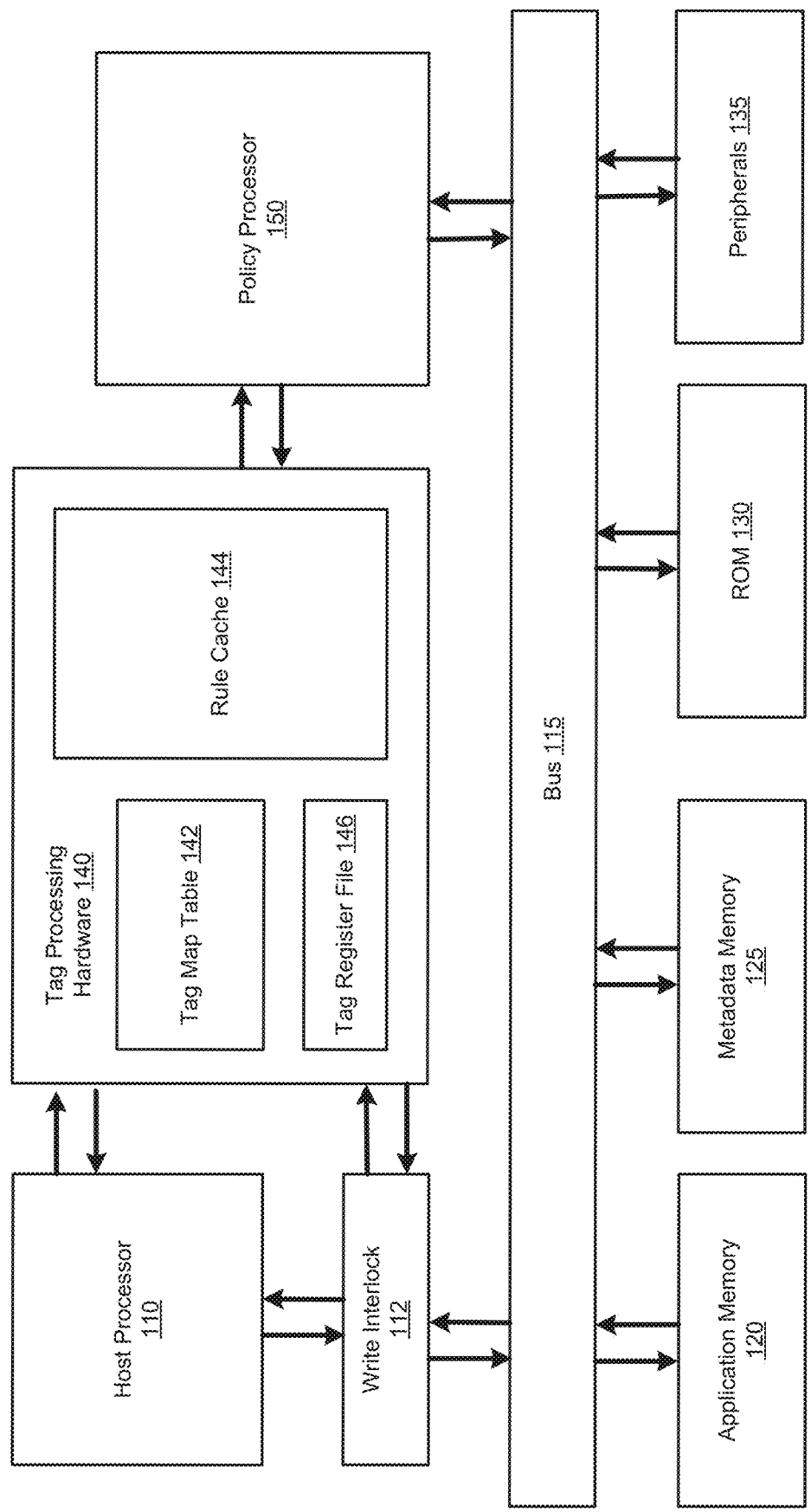
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map address X in the application memory 120 to address Y in the metadata memory 125. Such an address Y is referred to herein as a "metadata tag" or simply a "tag." A value stored at the address Y is also referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity.

For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 120. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more security rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructed read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding tag in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more input tags to a decision and/or one or more output tags. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150 and install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated via an address translation by the tag map table 142.

For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
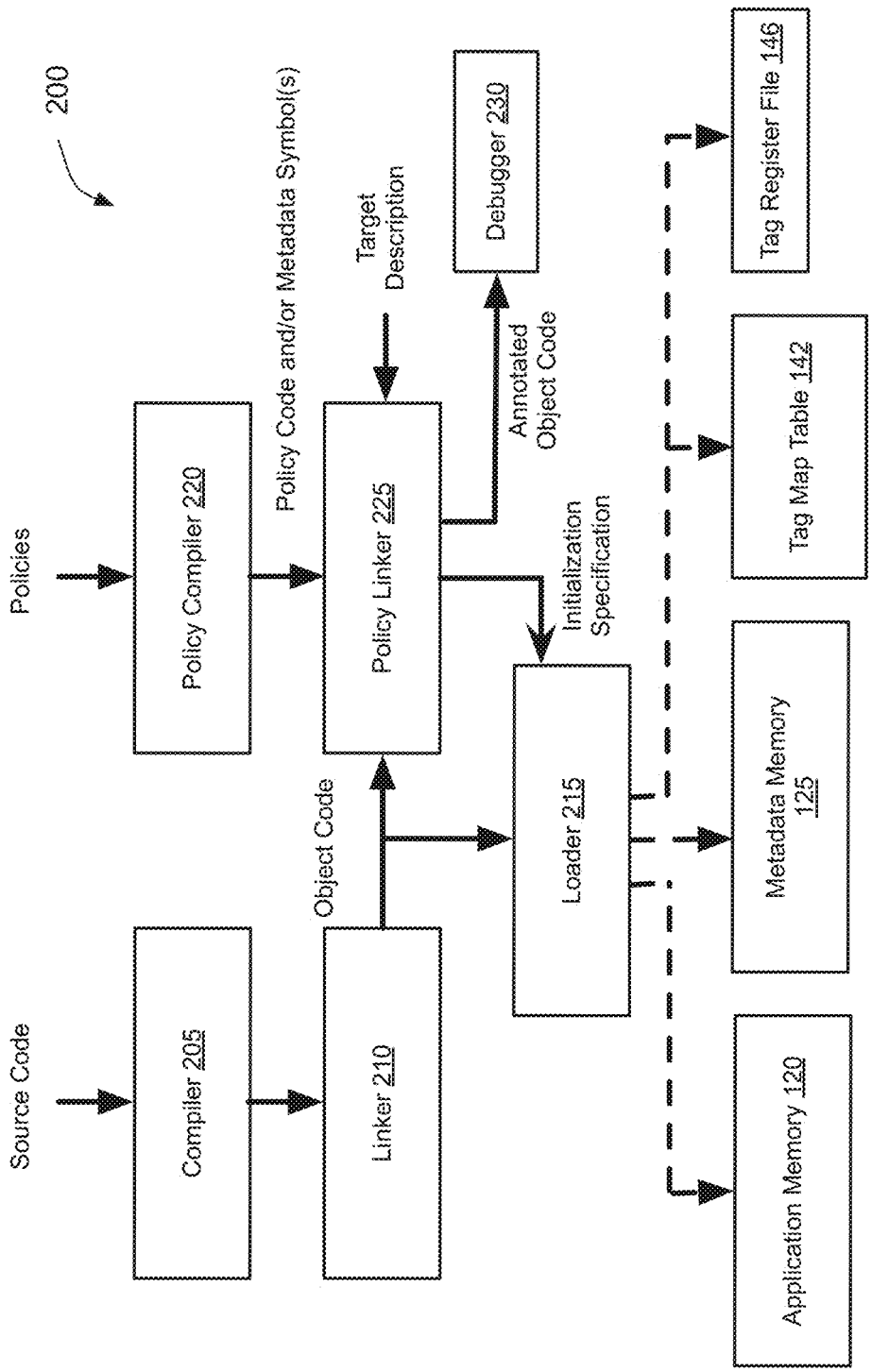
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically-defined binary representation. Additionally, or alternatively, the policy linker 225 may resolve one or more metadata symbols into a statically-defined binary representation, or a pointer to a data structure storing a statically-defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

Figure 6:
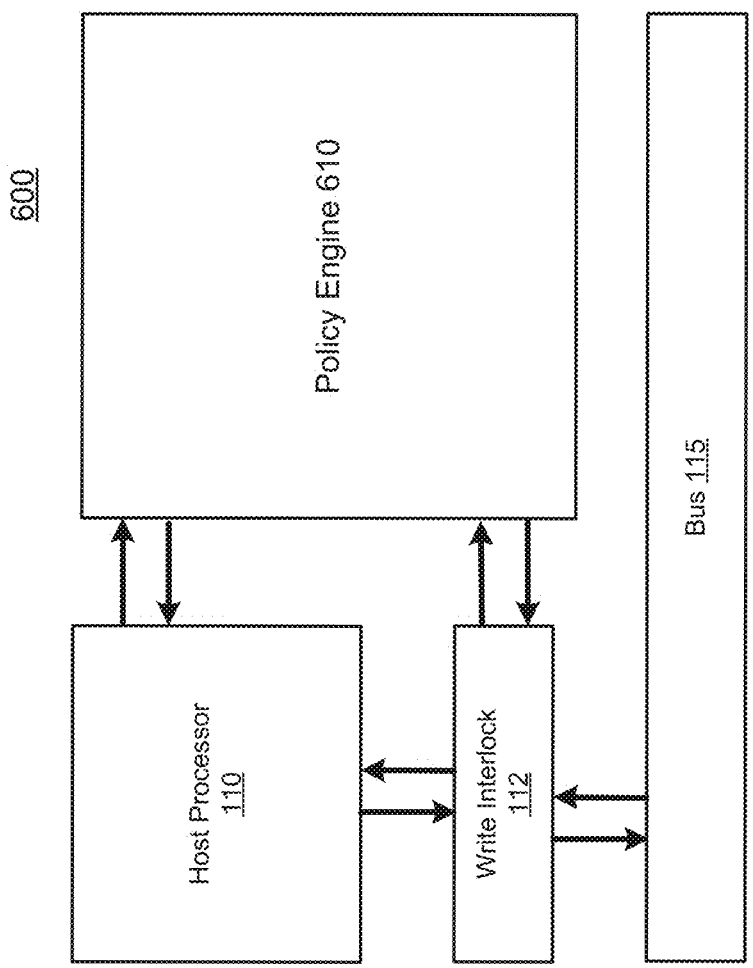
FIG. 6 shows an illustrative hardware system 600 for enforcing policies using a policy engine, in accordance with some embodiments.

In some embodiments, the policy linker 225 and/or the loader 215 may maintain a mapping of binary representations of metadata back to metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. An example of such assembly code is shown in FIG. 6 and discussed below. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which degrades system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not so limited. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

As discussed above, a set of policy rules may be applied to metadata associated with instructions for a host processor to determine whether the instructions should be allowed. Aspects of the present disclosure relate to techniques to simplify the processing of the metadata associated with these instructions. In some embodiments, a new technique is used to transform the instructions for a host processor to facilitate metadata processing (e.g., without changing the instruction processed by the host processor). These techniques may transform instructions in any of a variety of ways including: breaking down a complex instruction into a set of two or more simpler instructions (referred to hereinafter as "unrolling"), removing instruction(s) (e.g., removing those instructions that are not relevant for metadata processing), adding new instruction(s) (e.g., adding instructions to capture implicit operations performed by the host processor for which there is no explicit instruction), and/or replacing the instructions altogether (e.g., swapping one instruction for another, different instruction). The inventors have recognized and appreciated that these techniques may simplify a myriad of otherwise complex situations in metadata processing as described in more detail below. Thus, the computation complexity of creating a policy and/or determining whether these complex instructions violate the policy may be significantly reduced.

These techniques for transforming the instructions for metadata processing may be implemented in any of a variety of ways using, for example, the tag processing hardware 140 in the hardware system 100 shown in FIG. 1. In some embodiments, the tag processing hardware 140 may receive instruction information associated with an instruction for the host processor 110 (e.g., an instruction that has been executed by the host processor 110, an instruction that is currently being executed by the host processor 110, or an instruction that has yet to be executed by the host processor 110). The instruction information associated with the instruction may include, for example, any information indicative of the instruction or any component thereof such as the entire instruction itself, an instruction type (e.g., opcode) of the instruction, an address where the instruction is stored, registers where operands are stored, and/or one or more memory addresses referenced by the instruction. Upon receiving the instruction information, the tag processing hardware 140 may determine whether the instruction needs to be transformed for metadata processing or may be left unchanged. If the tag processing hardware 140 determines that the instruction needs to be transformed, the tag processing hardware 140 may obtain different instruction information associated with the transformed instructions that may replace the received instruction. Further, the tag processing hardware 140 may obtain the metadata associated with the transformed instruction. Otherwise, the tag processing hardware 140 may leave the received instruction information intact and obtain the metadata associated with the received instruction information.

The tag processing hardware 140 may make a determination as to whether a particular instruction needs to be transformed using metadata associated with the instruction information, such as a first data structure that stores information regarding the received instruction information. The first data structure may comprise, for example, either metadata to be processed to determine whether the instruction should be allowed or a pointer to other data structure(s) (e.g., a second and/or third data structures) that store instruction information associated with transformed instruction(s) to be used to override the received instruction information (for metadata processing purposes) and the associated metadata. The tag map table 142 may directly store the first data structure and/or store a pointer to a location of the first data structure (e.g., a pointer to a location in the metadata memory 125 where the first data structure is stored).

The tag processing hardware 140 may determine whether an instruction needs to be transformed using the first data structure in any of a variety of ways. In some embodiments, the first data structure may comprise a flag (e.g., a bit) indicative of whether the instruction needs to be transformed. Thus, the tag processing hardware 140 may read the flag stored in the first data structure and make the determination as to whether the instruction needs to be transformed based on the state of the flag. For example, the tag processing hardware 140 may interpret the additional information in the first data structure as metadata responsive to the flag being in the first state and interpret the additional information in the first data structure as a pointer responsive to the flag being in the second state. Additionally, or alternatively, the tag processing hardware may be configured to interpret a certain range of values of the first data structure to be indicative of whether the instruction needs to be transformed. For example, the tag processing hardware 140 may interpret the information in the first data structure as a pointer to a second data structure if the value of the first data structure is within a programmed range of values, and interpret the information in the first data structure as metadata responsive to the value of the first data structure being outside the programmed range.

Once the tag processing hardware 140 has determined whether the instruction needs to be transformed, the tag processing hardware 140 may generate the instruction information and associated metadata that may be provided to the rule cache 144 to determine whether an instruction for the host processor 110 violates a policy. The particular method employed to generate this information may depend on whether the instruction information needs to be transformed. If the tag processing hardware 140 determines that the instruction information needs to be transformed, the tag processing hardware 140 may access the other data structures identified in the first data structure (e.g., using the pointers in the first data structure) to obtain and output the new instruction information and the associated metadata. Otherwise, the tag processing hardware 140 may obtain the metadata directly from the first data structure and output the received instruction information along with the associated metadata obtained from the first data structure.

The techniques described herein to transform the instructions for metadata processing may advantageously employed to, for example, break down complex instructions into multiple smaller instructions (e.g., unrolling the complex instructions). The inventors have recognized that certain instructions in some ISAs may execute several lower-level operations. For example, the PUSH instruction in Version 7 of the ARM T32 ISA stores up to 16 values in consecutive memory locations, and increments a stack pointer register. Thus, a single PUSH instruction may cause state changes in up to 17 different hardware entities (e.g., up to 16 memory locations for new values, in addition to the stack pointer register). Attempting to directly associate metadata with such complex instructions may become unwieldy, and may increase processing time, memory usage, and/or complexity of creating a policy and determining whether these complex instructions violate the policy. Using the techniques described herein, the PUSH instruction in Version 7 of the ARM T32 ISA may be converted into a set of storage operations that each only involve a small number of storage locations (e.g., no more than 2 storage locations). For example, the first data structure associated with a complex instruction may include a pointer that directs the tag processor 140 to a new set of simpler, smaller instructions that may be output to the rule cache (instead of the complex instruction) along with the associated metadata for the simpler, smaller instructions. Unrolling complex instructions in such a fashion reduces the size and complexity of the metadata associated with the instruction along with the computational complexity of determining whether the instructions violate a policy. Thus, these new techniques enable systems to process metadata associated with these complex instructions with fewer computational resources.

The inventors have further appreciated that the techniques described herein to transform instructions for metadata processing may be employed to permit the tag processing hardware 140 handle implicit instructions (e.g., operations for which there is no associated explicit instruction executed by the host processor) including those implicit instructions associated with changes in context associated with the execution of the instructions by the host processor 110, such as the host processor 110 starting an interrupt service routine (ISR), switching threads, and/or making system calls. In these embodiments, the techniques to transform instructions for metadata processing may be employed to generate new instruction information and associated metadata that may be provided to the rule cache that accurately reflects any implicit instructions for the host processor 110.

When an ISR is triggered, the host processor 110 may automatically store a current value of the interrupt program counter (PC) at a selected memory location (e.g., that depends on the particular design of the host processor 110) and load the PC for the ISR as a replacement for the interrupt PC. As a result, the host processor 110 may change a storage location of both the interrupt PC and the PC for the ISR without receiving any explicit instruction to perform such operations. Further, the instruction information received by the tag processing hardware 140 may not directly reflect that these storage operations have occurred. The techniques described herein to transform instructions for metadata processing may be employed to generate new instruction information and associated metadata that reflects the performance of these implicit operations. For example, the first data structure associated with a first instruction in an ISR may include a pointer to a set of one or more instructions and associated metadata in other data structures that reflect the true operations performed by the host processor (e.g., the first instruction in the ISR in combination with the instructions to change the storage locations of the PC for the ISR and the interrupt PC). Thus, instruction information and associated metadata provided to the rule cache capture both the first instruction in the ISR along with the implicit storage instructions performed by the host processor 110.

It should be appreciated that still yet other techniques may be employed to handle implicit instructions. In some embodiments, the tag processing system 140 may purposefully trigger the policy processor 150 to handle these implicit instructions and, thus, reduce the size of the rule cache 144 because the rule cache 144 no longer has to handle these special situations. For example, the first data structure may store special metadata associated with the first instruction after a context change (e.g., a first instruction in an ISR) for which there is no corresponding rule stored in the rule cache 144. Thus, the rule cache 144 will be unsuccessful in matching the special metadata associated with the first instruction after the context change to a rule in the rule cache and trigger a rule cache miss. The rule cache miss may cause the tag processing hardware 140 to query the policy processor 150 for a response. The policy processor 150 may, in turn, read the special metadata and perform a process specific to handling the first instruction after the context change. For example, in the case of an ISR, the policy processor 150 may perform the appropriate changes to reflect these implicit operations itself (e.g., perform the same swap of metadata) and provide the tag processing hardware 140 a single-use rule applicable to the first instruction of the ISR. In some embodiments, the policy processor 150 may provide the single-use rule to the tag processing hardware 140 and then perform the appropriate changes, to reduce the amount of time the tag processing hardware 140 is waiting for the instruction. Alternatively, or in addition, the policy processor may perform the appropriate changes to reflect the operations of the instruction that experienced the rule cache miss, and the single-use rule may therefore be a NOP rule The inventors have further appreciated that the techniques described herein to transform the instructions for metadata processing may be employed to create security routines that are processed by the tag processing hardware 140 without changing the instructions for a computer program executed by the host processor 110. For example, the tag processing hardware 140 may supplement the instruction information associated with a particular instruction with instruction information (and associated metadata) for the security routine. As a result, the combined instruction information (and associated metadata) may be provided as an input to the rule cache 144. Thus, the rule cache 144 (and/or other components in the tag processing hardware 140) may effectuate the operations associated with the security routine.

When creating security policies for a computer program, it may be desirable to effect changes in the metadata state of the system at specific points during execution of the computer program by the host processor 110 (e.g., at interrupt entry, at system calls, at reset vectors, and/or at ordinary function calls). For example, various rules may need to be activated (or deactivated) at these points during execution of the computer program. Attempting to effectuate these changes by associating additional metadata with these instructions may be unwieldy for the rule cache 144 to process. Further, adding instructions to the executable program that perform no function (e.g., NOPs) simply for the purpose of associating metadata with these instructions to be processed is problematic because it requires modification of the application binaries as well as incurring a performance penalty (e.g., by forcing the host processor 110 to execute these extra instructions). The techniques described herein may be employed to enable the tag processing hardware 140 to supplement the instruction information associated with particular instructions (e.g., instructions at any of the specific points above) with additional instruction information (and associated metadata) associated with a security routine.

It should be appreciated that the security routine may perform any of a variety of functions such as: changing security privileges, activating rules (e.g., in the rule cache 144), and/or deactivating rules (e.g., in the rule cache 144). For example, the security privileges may be changed at system calls require transferring control from a lower privileged user application to a higher privileged operating system. Thus, the tag processor 140 may effectuate defined privileges modes on processors that don't implement such privilege modes in hardware. Further, for host processors that do implement such privilege modes in hardware, the performance penalty resulting from saving and/or restoring machine contexts may be eliminated because the function of implementing privilege modes may be performed by the tag processor 140. In another example, the security routine may be employed to create finer grained security policy that elevates privileges on entry to a specific function and lowers privileges at the completion of the function. Thus, the notion of privileged system calls may be extended to ordinary software functions. In yet another example, the security routine may identify specific invocations of a library function. In this example, a memory safety policy may rely on initializing a region of memory and the memory allocation code uses a memory set function in a shared library. Having the security routine run before the function may allow identification when the memory set function is being called to initialize memory instead of ordinary use by a computer program.

The inventors have further appreciated that the techniques described herein to transform the instructions for metadata processing may be employed to enable metadata processing even if limited information is accessible from the host processor 110. For example, the instruction information received by the tag processing hardware 140 may only include instruction information for certain instructions for the host processor (e.g., a filtered representation of the instructions for the host processor). In some embodiments, the instruction information received may only include information regarding branch instructions and omit information regarding other non-branch instructions. In these embodiments, the instruction information associated with branch instructions may be unrolled into a set of one or more instructions that correspond to an entire instruction path that starts the branch instruction and ends with the next subsequent branch instruction. Thus, the tag processing hardware 140 may be able provide instruction information and associated metadata to the rule cache 144 based on only a fraction of the instructions for the host processor 110 (e.g., only the branch instructions). As a result, the bandwidth requirement between the tag processing hardware 140 and the source of the instruction information (e.g., the host processor 110) is substantially reduced. Accordingly, fewer (if any) modifications may need to be made to the host processor 110 to provide the appropriate information to the tag processing hardware 140 to enable metadata processing.

The branch instruction may be unrolled into a set of one or more instructions that correspond to an entire instruction path including the branch instruction in any of a variety of ways. In some embodiments, a software application (e.g., a software toolchain) may divide the instructions for a computer program to be executed by the host processor 110 into instruction paths that each start with a first branch instruction, end with a second branch instruction, and comprise one or more intermediary instructions between the first and second branch instructions. Thus, these instruction paths may be the longest continuous segments of instructions in the computer program that do not include a branch. Instruction information associated with all of the instructions in the segment (along with the associated metadata) may be stored in data structures that are associated with the first branch instruction (e.g., prior to execution of the computer program by the host processor 110). As a result, the tag processing hardware 140 may unroll a branch instruction into all of the instructions associated with the instruction path to which the branch instruction corresponds.

It should be appreciated that various techniques, such as static code analysis techniques, may be employed to boil down an entire instruction path into a smaller set of instructions that achieve the same net effect (e.g., are semantically equivalent). This smaller set of instructions may be associated with the branch instruction in the data structures in place of the entire instruction path. Thus, the size of the instruction information and associated metadata generated by the tag processing hardware 140 for a given branch instruction may be reduced. For example, the instruction path may be analyzed to determine the operations in the instruction path. The identified operations in the instruction path may, in turn, be employed to generate a smaller set of instructions based on the determined operations in the instruction path that achieve the same semantics. As a result, certain operations that are implemented using multiple instructions (such as a sequence of subtraction and shift operations) may be simplified into a smaller number of instructions (e.g., a single division operation). Further, one or more instructions in the instruction path may be removed altogether to form the simplified set of instructions in cases where the particular instructions are irrelevant for metadata processing purposes.

The techniques described herein to transform the instructions for metadata processing may be used in combination with other techniques to further simplify the process of associating metadata with instruction information and/or determining whether instructions violate a policy. In some embodiments, the tag processing hardware 140 may employ its own ISA that is separate and distinct from the ISA used by the host processor 110. The ISA employed within the tag processing hardware 140 may be specifically designed for the association and analysis of metadata. Thus, any information in an instruction that is irrelevant to the tag processing hardware 140, such as the distinction between opcodes for different mathematical operations, can be genericized or removed altogether. For example, the differences between the following opcodes: AND, OR, XOR, NOT, ADD, SUBTRACT, MULTIPLY, DIVIDE, REMAINDER, SHIFT may be inconsequential for the purposes of associating metadata with these instructions. Accordingly, all these opcodes may map to a single opcode in the ISA used by the tag processing hardware.

Employing a separate ISA in the tag processing may provide any number of benefits over using the ISA employed by the host processor 110 throughout the tag processing hardware 140. For example, the tag processing hardware 140 may be agnostic to the ISA employed by the host processor 110. Thus, the same (or substantially similar) tag processing hardware 140 may be used with a wide variety of processor types with different ISAs. Further, the policies that are applied by the tag processing hardware 140 may be simpler to write, more verifiable, and more portable across different ISAs because the policies only need to be designed to operate on instructions and associated metadata in a single ISA. Still yet further, the hardware area may be reduced by requiring a smaller number of bits to express the instruction opcodes because the new ISA may have a smaller number of potential opcodes than the host ISA (e.g., because of the simplification of various mathematical opcodes to a single operand). For example, the number of bits required to represent the opcodes may be reduced and, thus, reduce the required memory capacity to store opcodes. Additionally, in embodiments where the rule cache receives the opcode as an input to determine whether a rule is violated, the width of the rule cache may be reduced due to the reduced number of bits required to represent the opcode.

Figure 3:
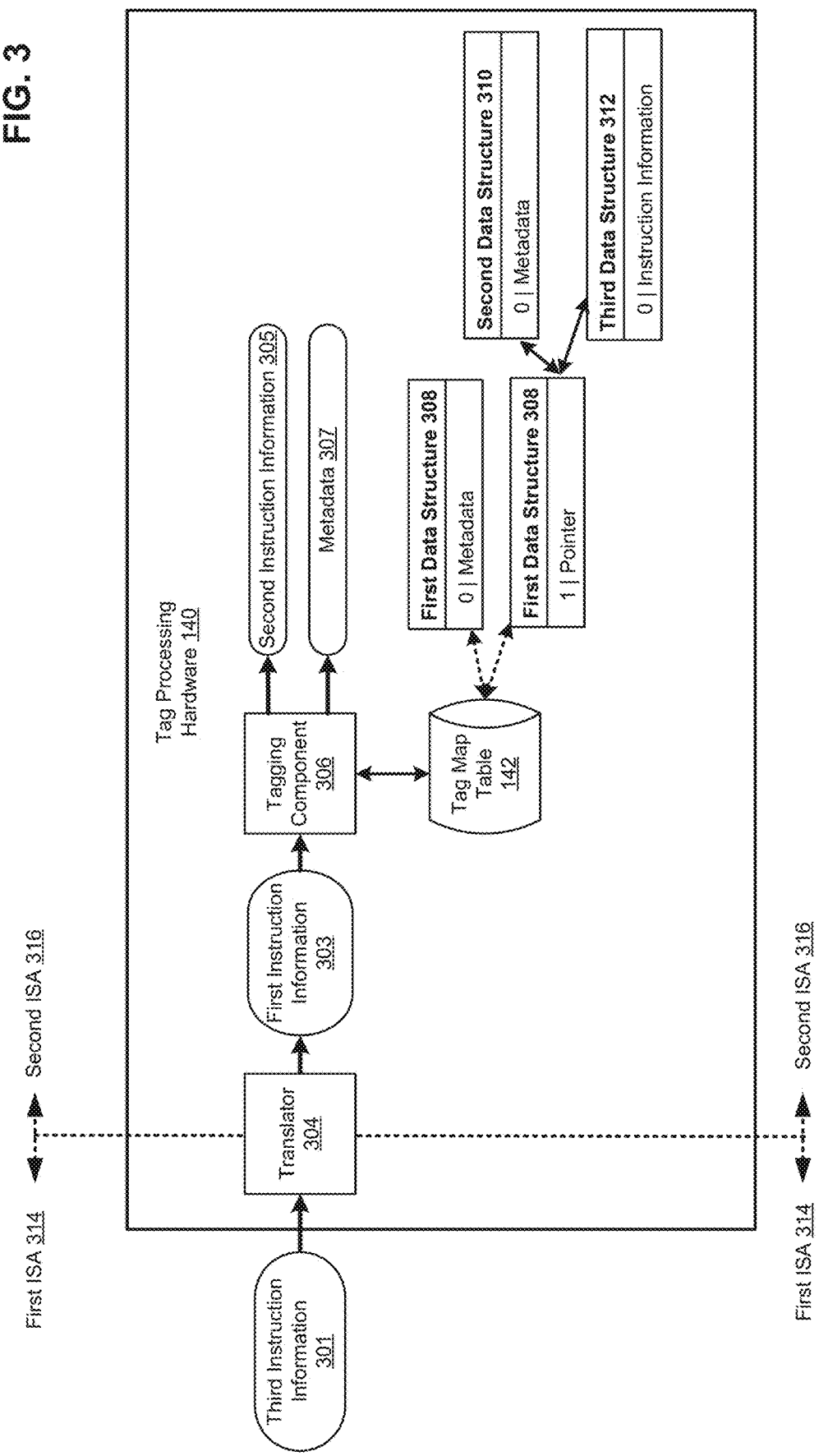
FIG. 3 shows an illustrative implementation of the tagging processing hardware 140 of FIG. 1 for associating metadata with instruction information, in accordance with some embodiments.

An example implementation of the tag processing system 140 that is configured to perform the techniques described herein to transform the instructions for metadata processing and employ its own ISA that is different from the host ISA is shown in FIG. 3. As shown, the tag processing hardware 140 receives third instruction information 301 that is associated with an instruction in a first ISA 314. The third instruction information 301 may be translated using a translator 304 from the first ISA 314 to a second, different ISA 316 to generate first instruction information 303. The tagging component 306 may use the information in the tag map table 142 and/or information stored in the first, second, and/or third data structures 308, 310, 312 to identify second instruction information 305 and associated metadata 307. The second instruction information 305 and associated metadata 307 output by the tagging component 306 may, in turn, be employed by the tag processing hardware 140 to determine whether an instruction violates a policy (e.g., using any of the techniques described above).

The third instruction information 301 may include information indicative of an instruction for a host processor in the first ISA 314. The third instruction information 301 may, for example, comprise one or more of the following pieces of information: (1) an instruction type (e.g., opcode), (2) an address where the instruction is stored, (3) one or more memory addresses referenced by the instruction, (4) one or more register identifiers, (5) the instruction itself or any component thereof, and/or (6) signals to indicate if a conditional instruction was executed or not. The particular way by which the third instruction information 110 is received may vary based on the particular implementation.

In some embodiments, the third instruction information 301 may comprise information indicative of the instructions output by the final processing stage of the host processor. Thus, the third instruction information 301 may only contain information regarding retired instructions (e.g., instructions that have been fully executed by the host processor and were needed for execution of a program flow). In these embodiments, the third instruction information 301 may be directly provided to the translator 304 for translation to generate the first instruction information 303.

In some embodiments, the third instruction information 301 may comprise information regarding instructions output by an intermediate stage of the host processor (e.g., a stage earlier than the final stage). Thus, the third instruction information 301 may contain information regarding both instructions necessary for the execution of the computer program (e.g., those instructions that will become retired instructions) and those instructions that are not necessary for the execution of the computer program (e.g., those instructions that will not become retired instructions). In these embodiments, the tag processing hardware 140 may implement a mechanism to separate the information associated with instructions that will become retired instructions from that information associated with instructions that are never retired. Thus, only the information associated with instructions that will become retired instructions (e.g., instructions that will be fully executed) may be provided to the translator 304 while the information regarding the instructions that will not become retired (e.g., instructions that will not be fully executed) may be ignored. Any of a variety of techniques may be employed to separate the instruction information. For example, a pair of First-In-First-Out (FIFO) queues may be employed where a first FIFO queue may capture the received instructions from the host processor, including a mix of some instructions that will be retired and some instructions that will never be retired, as well as a corresponding address where each of those instructions are stored. The second FIFO queue may capture the addresses of the instructions that have been retired by the host processor. Once both FIFO queues are non-empty, the tag processing hardware 140 may pop off instructions in the first FIFO until an instruction address in the first FIFO queue matches an instruction address in the second FIFO queue (e.g., indicating that a particular instruction stored in the first FIFO queue has been retired). The matching instructions in the first FIFO queue may, in turn, be provided to the translator 304 for translation into the first instruction information 303.

In some embodiments, the third instruction information 301 may be obtained by snooping the read interface of the host processor's instruction cache and maintaining a mirror image of the cache (e.g., a mirror cache) to fetch instructions based on instruction addresses received from the host processor. In these embodiments, the tag processing hardware 140 may maintain a mirror of the host processor's L1 cache by snooping the read interface of the L1 cache. For every instruction the L1 cache reads in, the tag processing hardware 140 may provide the corresponding instruction contained in the mirror cache as an input to the translator 304 for translation into the first instruction information 303. In order to account for the pipeline delay of the host processor and/or the delay in receiving information from the host processor, the writes into the mirror cache may be delayed by the same number of cycles. For example, the instruction that causes the L1 cache to do a refill action may also cause the eviction (and/or overwrite) of a line in the L1 cache containing recently consumed instructions. If the tag processing hardware 140 mirrors the L1 cache in real time, the tag processing hardware 140 may evict the line containing the instruction(s) from the mirror cache that have yet to flow out of the host processor (due to the pipeline delay in the host processor). If, however, the tag processing hardware 140 waits for a number of instructions equal to the number of stages in the host processor to flow out of the host processor before updating the mirror cache, then all the lines in the mirror cache match the state of the L1 cache at the time the instruction fetch occurred in the host processor. Due to the possibility of the host L1 cache and the mirrored L1 cache having different eviction policies, a mechanism may also be provided for reading the instruction bits from main memory when the mirror cache experiences a miss (e.g., caused by a program flow change event to code not cached, linear code that exceeds the size of the cache, etc.).

In some embodiments, the third instruction information 301 may be obtained by the tag processing hardware 140 using the instruction address received from the host processor to re-fetch the instructions from main memory. In these embodiments, the tag processing hardware 140 may read the instruction from main memory using the instruction address associated with the instruction received from, for example, the host processor. Thus, the tag processing hardware 140 may not need to maintain a mirror image of the L1 cache of the host processor. However, in some embodiments, the tag processing hardware 140 may utilize a mirror cache that is a mirror image of the L1 cache. Employing a mirror cache may advantageously prevent memory fetches for each line of instructions occurring twice in close temporal proximity. Thus, the power consumption of the hardware and memory bandwidth congestion may be reduced. Unlike the snoop method discussed above, this method may not require the mirror cache in the tag processing hardware 140 to be the same size and shape as the host processor's L1 instruction cache. In some embodiments, this method may utilize snooping of the host's L1 read interface to populate a buffer of recently fetched lines such that misses in the mirror cache of the tag processing hardware 140 may then hit one of these buffered lines. In some embodiments, in this method, the instruction data stored in the mirror cache in the tag processing hardware 140 may be, for example, data either before or after going through the ISA translation. Translating the instructions in the mirror cache may advantageously reduce the size of the instructions (e.g., because the translated instructions may be smaller than host instructions), which may reduce the size of the mirror cache as well as power.

As discussed above, the tag processing hardware 140 may employ its own ISA (e.g., the second ISA 316) that is different from the ISA employed by the host processor (e.g., the first ISA 314). Accordingly, the tag processing hardware 140 may include components to translate the third instruction information 301 that is in the first ISA to corresponding first instruction information 303 that is in the second ISA. This translation may be performed, at least in part, by the translator 304, which may be implemented as a hardware translator, a software translator, or any combination thereof.

The particular method employed by the translator 304 to translate the third instruction information 301 to the first instruction information 303 may vary based on the particular implementation. In some embodiments, the translator 304 may perform the translation dynamically during the run-time of the tag processing hardware 140. In these embodiments, the translator 304 may employ a set of known relationships between the first and second ISAs 314 and 316, respectively, (e.g., in the form of a look-up table) to perform this conversion. For example, the translator 304 may use mappings between opcodes in the first ISA and opcodes in the second ISA (e.g., the opcodes ADD and SUBTRACT in the first ISA 314 map to the opcode MATH OPERATION in the second ISA 316) to convert the opcode portion of the instruction from the first ISA 314 to the second ISA 316. In other embodiments, the translation of the instructions in a computer program between the first and second ISAs 314 and 316, respectively, may be performed before execution of the tag processing hardware 140 and stored in memory. In these embodiments, the translator 304 may retrieve the pre-translated instructions in the second ISA 316 from memory that match the input instructions in the first ISA 314. As a result, the complexity of the translator 304 may be reduced.

In some embodiments, certain instructions in the first ISA 314 may not neatly map to a single instruction in the second ISA 316. Instead, these instructions in the first ISA 314 may map to a plurality of instructions in the second ISA 316 (e.g., these instructions in the first ISA 314 need to be unrolled into multiple simpler instructions). In these embodiments, the translator 304 may not fully translate instructions in the first ISA 314 that correspond to multiple instructions in the second ISA 316. The translator 304 may, instead, provide the untranslated (or partially translated) first instruction information 303 to the tagging component 306 that may, in turn, be used by the tagging component 306 to generate the second instruction information 305 that is fully translated. For example, in response to the third instruction information 301 mapping to multiple instructions in the second ISA 316, the translator 304 may simply pass-through the third instruction information 301 in the first ISA 314 to the tagging component 306 as the first instruction information 303. Alternatively, the translator 304 may output a single instruction (e.g., a first instruction) in the set of instructions in the second ISA 316 to which the received third instruction information 301 corresponds as the first instruction information 303. In this example, the translator 304 may also output a flag to notify the tagging component 306 that the translation is incomplete.

The distinction between instructions that need to be transformed may be determined prior to run-time of the tag processing hardware 140. In some embodiments, a software application (e.g., a software toolchain) may identify instructions in a computer program to be executed by the host processor that need to be transformed. In these embodiments, the software application may generate an indication of which instructions in the computer program need to be transformed and store this indication in metadata memory (e.g., metadata memory 125). For example, the software application may generate a first data structure 308 for each instruction that includes a flag indicative of whether a given instruction needs to be transformed. If the instruction does not need to be transformed (shown in FIG. 3 as state "0"), the flag in the first data structure 308 may be accompanied by the metadata to associated with the respective instruction (e.g., the instruction to which the particular first data structure 308 corresponds). If the instruction does need to be transformed (shown in FIG. 3 as state "1"), the flag in the first data structure 308 may be accompanied by pointer(s) to other data structure(s) that include new instruction information (shown as third data structure 312) and the associated metadata (shown as second data structure 310). The first data structure 308 may, in some embodiments, only include a pointer to one of the second and third data structures 310 and 312. In these embodiments, the remaining data structure (e.g., the data structure for which there is no explicit pointer to in the first data structure 308) may be located a fixed offset in memory away from the other data structure (e.g., the data structure for which there is an explicit pointer to in the first data structure 308). Thereby, one of data structures 310 and 312 may be found using a pointer in the first data structure 308 and the remaining data structure may be found by reading another memory location that is a fixed distance away from the target of the pointer. In other embodiments, the first data structure 308 may include pointers to both the second data structure 310 and the third data structure 312.

It should be appreciated that these second and third data structures 310 and 312, respectively, may further include pointers to still yet other data structures if additional instruction information and/or metadata is necessary. For example, the third data structure 312 may include some instruction information and a pointer to another data structure with additional instruction information. In this example, the flag in the third data structure 312 may be set to indicate that additional information is available (e.g., the flag may be in state "1" instead of "0"). Similarly, the second data structure 310 may include some metadata and a pointer to another data structure with additional metadata.

In some embodiments, the stored information regarding whether a particular instruction needs to be transformed may be employed by the tagging component 306 to generate second instruction information 305 that is fully translated in the second ISA 316 (e.g., is transformed as appropriate) and associated metadata 307. In these embodiments, the tagging component 306 may locate the first data structure 308 associated with the first instruction information 303. For example, the tagging component 306 may identify an entry in the tag map table 142 that corresponds to the first instruction information 303 and include either a pointer to the location of the relevant first data structure 308 or the relevant first data structure 308 itself. Once the tagging component 306 has identified the relevant first data structure 308, the tagging component 306 may read the flag contained in the first data structure 308 to determine whether the first instruction information 303 needs to the transformed. If the flag indicates that the first instruction information 303 does not need to be transformed, the tagging component 306 may retrieve the metadata associated with the first instruction information 303 from the first data structure 308 and output the metadata as the metadata 307. Further, the tagging component 306 may directly output the first instruction information 303 as the second instruction information 305. If the flag indicates that the first instruction information 303 does need to be transformed, the tagging component 306 may read the pointer included in the first data structure 308 to other data structures that include in the new instruction information (shown as the third data structure 312) and the metadata to associated with the new instructions (shown as the second data structure 310). Further, the tagging component 306 may output the new instruction information in the third data structure 312 as the second instruction information 305 and output the metadata in the second data structure 310 as the metadata 307.

It should be appreciated that various modifications may be made to the particular implementation of the tag processing hardware 140 shown in FIG. 3 without departing from the scope of the present disclosure. For example, the translator 304 and the tagging component 306 may be combined into a single component. In this example, the tag map table 142 may contain information that describes the relationships between the third instruction information 301 and the first data structure 308 (e.g., the tag map table 142 may comprise entries that match the third instruction information 301 to storage locations of corresponding first data structures). Further, the first data structure 308 may include a pointer to other data structures that comprises new instruction information that is a pre-translated (and/or unrolled) version of the third instruction 301 in addition to metadata associated with the new instruction information. Thus, the combined translator and tagging component may access the first data structure 308 to identify a pointer to the storage location of instruction information that is translated into the second ISA and the associated metadata. The instruction information may, in turn, be provided as the second instruction information 305 and the associated metadata may be output as metadata 307.

FIG. 6 shows an illustrative hardware system 600 for enforcing policies using a policy engine, in accordance with some embodiments. A computing system can include hardware system 600, which can be configured to enforce security policies as described herein. This hardware system can include host processor 110, a policy engine 610, and an interlock 112. These components can interoperate to enforce the security policies. The host processor 110 can execute an instruction and provide instruction information to the policy engine 610 and the result of the executed instruction to the interlock 112. The policy engine 610 can determine whether the executed instruction is allowable according to one or more security policies using the instruction information. The interlock 112 can buffer the result of the executed instruction until an indication is received from the policy engine 610 that the instruction was allowable. The interlock 112 can then release the result of the executed instruction for use by the remainder of the computer system.

The policy engine 610 can determine whether the executed instruction is allowable based on metadata associated with the instruction. The metadata may concern memory locations or entities such as hardware components or software component of the computing system. Multiple refinements are disclosed herein to increase the efficiency and flexibility of this architecture.

In particular, the inventors have recognized and appreciated that configuring the policy engine 610 to transform instructions received from the host processor 110 into one or more other instructions can provide benefits including a reduction in the complexity of the policy engine 610 and provide opportunities to speed policy evaluation.

The inventors have also recognized and appreciated that configuring the policy engine 610 to add inserted instructions to the policy evaluation pipeline can provide benefits including an ability to address inferred host processor 110 actions and provide further support for comprehensive security policies.

The inventors have further recognized and appreciated that configuring the policy engine 610 to transform instructions received from the host processor 110 into an intermediate representation can increase the portability and flexibility of the envisioned systems and methods.

In such embodiments, the translation from host processor 110 instructions to intermediate representations can be addressed and optimized independently from the evaluation of security policies based on the intermediate representations.

The inventors have further recognized and appreciated that the disclosed policy engine 610 may be realized using hardware (e.g. an application specific integrated circuit, or a collection of discrete components) alone or combination with firmware (e.g., a field-programmable gate array or programmable read-only memory programmed to operate with a particular host processor and/or interlock) and/or software (e.g., a policy processor configured to implement one or more policies implemented in software). Though described below for convenience with respect to tag processing hardware 140 and a policy processor 150, this description is not intended to be limiting.

Policy engine 610 can be configured to ensure that instructions being executed by the host processor 110 comply with one or more policies. Policy engine 610 can include any suitable combination of hardware, firmware, and/or software suitable for performing this task. For example, policy engine 610 can include tag processing hardware 140 and policy processor 150. In some embodiments, tag processing hardware 140 may be configured for rapid execution of policy decisions. In various embodiments, policy processor 150 may be configured to address special-case or complicated policy decisions (e.g., those involving function calls or interrupt handling) and/or initial policy decisions (e.g., a first evaluation of a policy with respect to a particular instruction, set of instructions, memory location, and/or entity).

Figure 4:
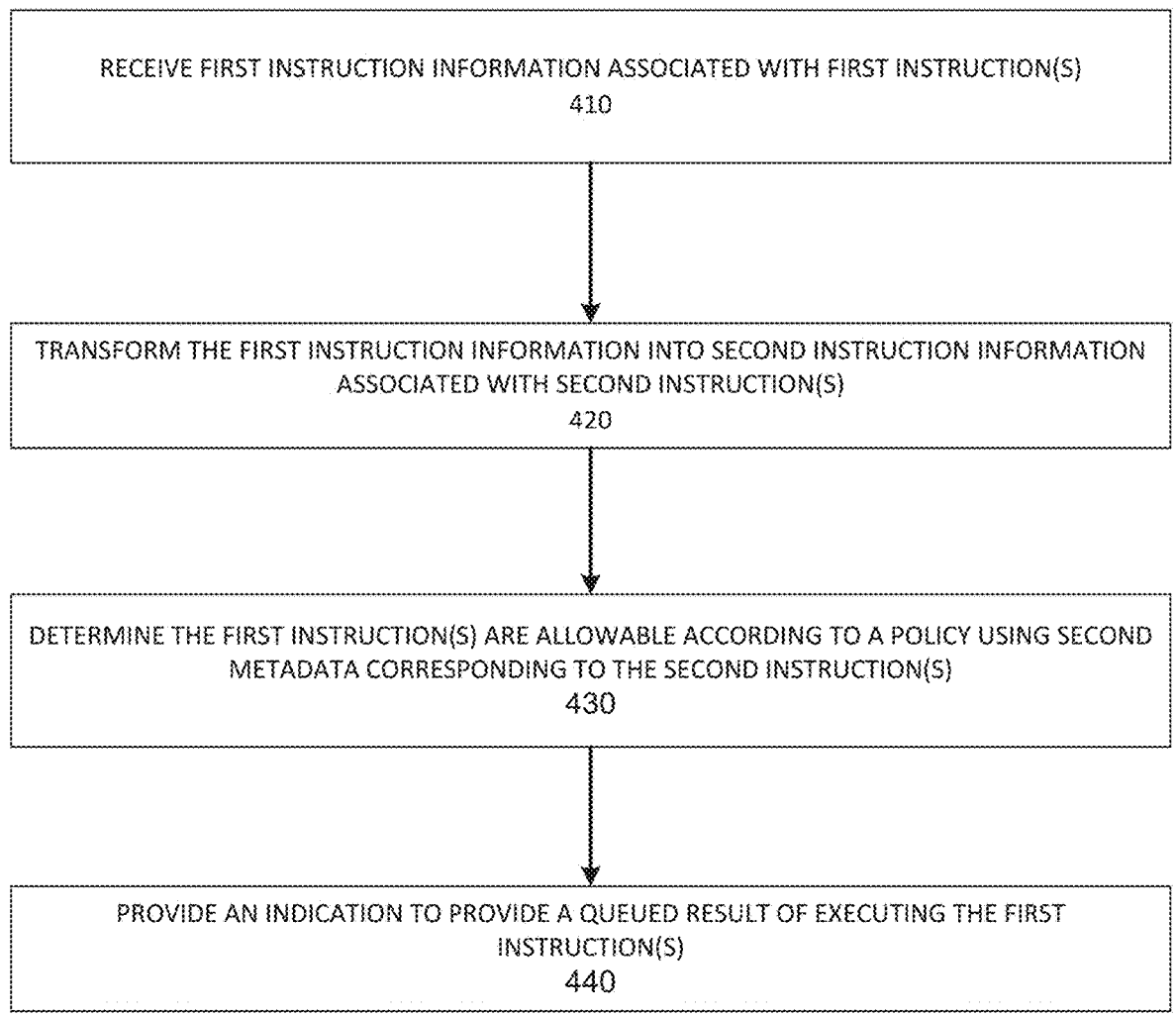
FIG. 4 shows an illustrative policy enforcement process performed by the policy engine using transformed instructions.

FIG. 4 shows an illustrative policy enforcement process 400 performed by policy engine 610 using transformed instructions. Process 400 can include the acts of receiving first instruction information associated with at least one first instruction, transforming the first instruction information into second instruction information associated with at least one second instruction, determining the at least one first instruction is allowable according to a policy using second metadata corresponding to the at least one second instruction, an providing an indication to the interlock. This indication may instruct the interlock to provide a queued result of executing the at least one first instruction to remainder of the computing system. In this manner, the allowability of the at least one first instructions can be determined using the metadata associated with the at least one second instructions.

In some embodiments, the at least one second instructions may comprise simpler instructions (or instructions from a more limited set of instructions) that are equivalent to the at least one first instruction. Configuring policy engine 610 to evaluate the at least one second instruction can allow for a simpler policy engine (as the second instructions may be simpler or fall within a more limited set of instructions). In various embodiments, a second instruction may correspond to multiple first instructions, allowing policy engine 610 to realize efficiencies in evaluating policies.

In act 410, policy engine 610 can receive first instruction information associated with the at least one first instructions. As described herein, the first instruction information can include any information indicative of the instruction or any component thereof such as the entire instruction itself, an instruction type (e.g., opcode) of the instruction, an address where the instruction is stored, registers where operands are stored, and/or one or more memory addresses referenced by the instruction. This first instruction information can be received according to any of the approaches described herein.

In act 420, policy engine 610 can transform the first instruction information into second instruction information associated with at least one second instruction. In some embodiments, the at least one second instruction can include instructions equivalent to the first instruction. In some instances, the one or more first instruction may be equivalent to one or more second instructions when the one or more first instruction is convertible into a set of second instructions. A PUSH instruction in Version 7 of the ARM T32 ISA, for example, can be converted into set of storage operations that each only involve a small number of storage locations (e.g., no more than 2 storage locations). A set of addition instructions, as an additional example, can be converted into a multiplication instruction. In various instances, the one or more first instruction may be equivalent to the plurality of instructions when execution of the at least one first instruction and the plurality of instructions, by the host processor with the same operands, generates the same output. In this manner, under execution by host processor 110, the first instruction and the plurality of instructions may have the same input-output relationship. For example, the at least one first instruction or the plurality of instructions can include instructions that do not affect the state of the computing system. In some instances, the at least one first instruction and the plurality of instructions can affect the same entities and/or memory locations. For example, multiple operations affecting a memory location, entity, or the like may be equivalent to a single operation affecting the same memory location, entity, or the like, as policy engine 610 may address whether instructions may be executed, rather than the values generated by executing the instructions. Evaluating the single operation in place of the multiple operations may increase the efficiency and speed of policy engine 610.

In some embodiments, the second instruction information can include any information indicative of the at least one second instructions or any component thereof such as the at least one second instructions itself, an instruction type (e.g., opcode) of the at least one second instructions, an address where the at least one second instructions is stored, registers where operands are stored, and/or one or more memory addresses referenced by the at least one second instructions.

In various embodiments, policy engine 610 can obtain the second instruction information using the first instruction information. For example, policy engine 610 can obtain first metadata associated with the at least one first instruction, using at least one of the approaches described herein. The first metadata can indicate a location of the second instruction information and/or metadata. For example, the first metadata can include at least one pointer to at least one data structure. The at least one data structure can contain the second instruction information (which may correspond to a plurality of instructions equivalent to the at least one first instruction). In some embodiments, policy engine 610 can use the second instruction information to obtain the metadata associated with the at least one second instruction. In various embodiments, the at least one data structure can include the metadata for the at least one second instruction.

In some embodiments, the at least one first instruction can be, or can include, a first branch instruction. As described above, the host processor may be configured to provide only include information regarding branch instructions and omit information regarding other non-branch instructions. In such embodiments, the at least one second instruction can include an instruction path including the first branch instruction. Alternatively, the at least one second instruction can include a set of instructions semantically equivalent to the instruction path. The semantically equivalent instructions may omit one or more instructions in the instruction path. Furthermore, the semantically equivalent instructions may replace one or more instructions in the instruction path corresponding to a single operation with an instruction representing that operation. Policy engine 610 can obtain the second instruction information for the instruction path using the first instruction information. For example, policy engine 610 can use the first instruction information to obtain first metadata corresponding to the branch instruction. The first metadata can indicate a location of instruction information and/or metadata for the instruction path. For example, the first metadata can include a pointer indicating a location of instruction information and/or metadata for the instruction path.

In act 430, policy engine 610 can determine the at least one first instruction is allowable according to a policy using second metadata corresponding to the at least one second instruction. This evaluation may proceed as described elsewhere herein. In act 440, policy engine 610 can provide an indication to an interlock. The interlock may then release the result(s) of the at least one first instruction to the remainder of the computer system.

Figure 5:
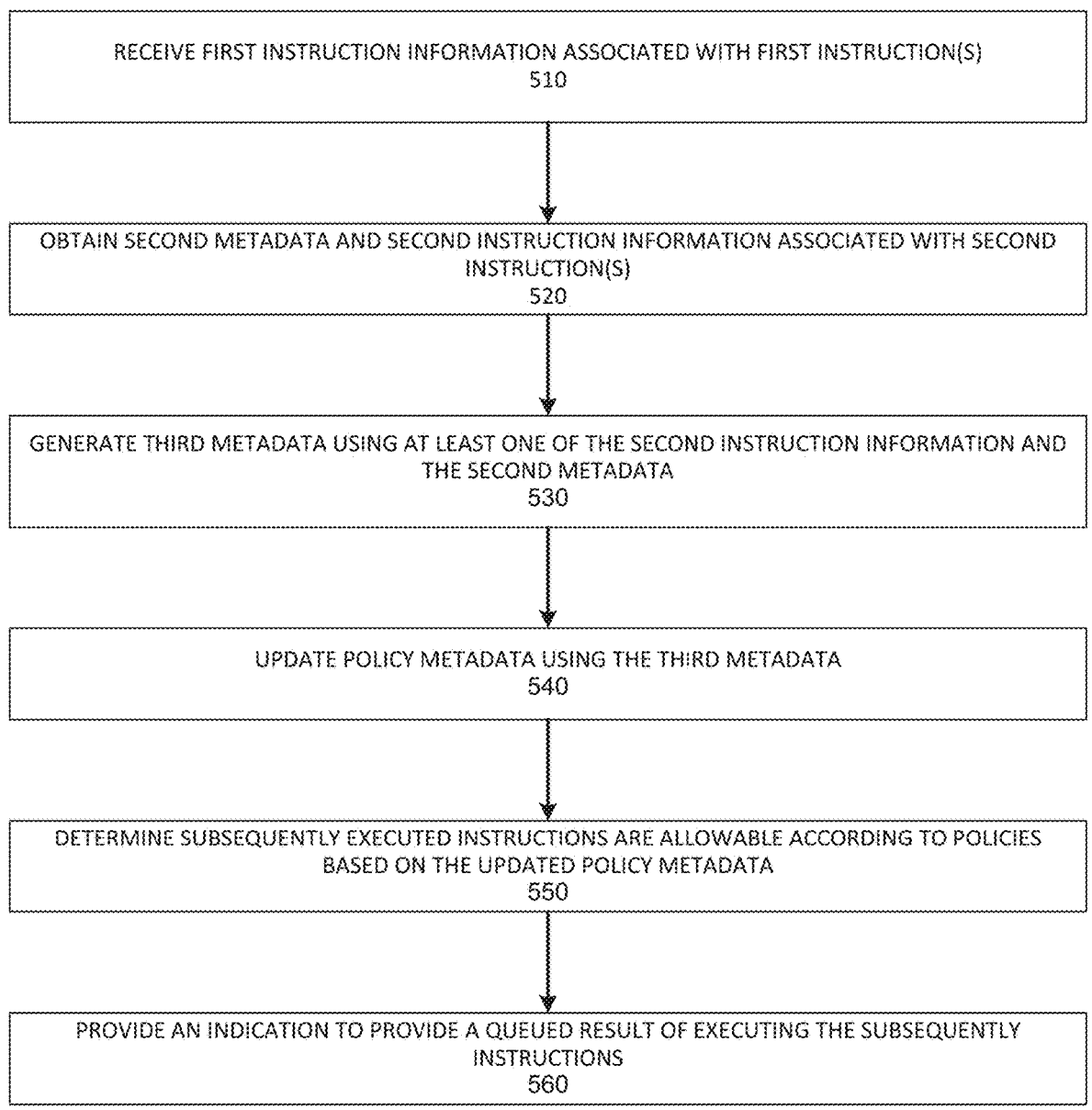
FIG. 5 shows an illustrative policy enforcement process by the policy engine using added instructions.

FIG. 5 shows an illustrative policy enforcement process 500 by policy engine 610 using added instructions. Process 500 can include the acts of receiving first instruction information associated with at least one first instruction, obtaining second metadata and second instruction information associated with at least one second instruction, generating third metadata using at least one of the second instruction information and the second metadata, and updating policy metadata using the third metadata. Once the policy metadata has been updated, policy engine 610 may determine whether subsequent instructions executed by the host processor are allowable according to policies based on the updated policy metadata. When such instructions are allowable, policy engine 610 can provide an indication of allowability to an interlock. The interlock can then provide a queued result of executing the subsequent instructions to the remainder of the system.

In act 510, policy engine 610 may receive first instruction information associated with at least one first instruction. As described herein, the first instruction information can include any information indicative of the instruction or any component thereof such as the entire instruction itself, an instruction type (e.g., opcode) of the instruction, an address where the instruction is stored, registers where operands are stored, and/or one or more memory addresses referenced by the instruction. This first instruction information can be received according to any of the approaches described herein.

In some embodiments, the at least one first instruction can be associated with a change in host processor context. In some instances this change in host processor context can correspond to initiation of an interrupt service routine, thread switching, exception, or a system call. For example, the first instruction can be an initial instruction in an interrupt service routine, or concern an address within an interrupt vector table.

In act 520, policy engine 610 may obtain second metadata and second instruction information associated with at least one second instruction. The at least one second instruction may include one or more inserted instructions. The inclusion of the inserted instructions may cause the at least one second instruction to become semantically different from the at least one first instruction. For example, while the inserted instruction may correspond to instructions that could be executed by host processor 110, security engine 610 may be configured to obtain the inserted instructions regardless of whether they were included in the at least one first instruction, in order to effectuate an update in the metadata. For example, the at least one second instruction may be obtained to effectuate an update to the at least one of the tag map table, the tag register file, or the metadata memory. This update can ensure that the metadata is, or remains, consistent with one or more policies enforced by policy engine 150.

In various embodiments, the at least one second instruction can include a set of instructions corresponding to operations performed by the host processor when changing context. These instructions may be predefined and may depend on a type of the host processor. For example, when the host processor executes a particular type of context change (e.g., servicing an interrupt) the host processor may perform a standard set of operations that depend on the architecture of the host processor. Policy engine 610 may be configured to infer the performance of these operations based on the receipt of the at least one first instruction. To accurately reflect to the state of the computing device, policy engine 610 may therefore add additional instructions to the policy evaluation pipeline, such that the tag map table, the tag register file, and/or the metadata memory correctly reflect the state of the system.

In some embodiments, tag processing hardware 140 may use the received at least one instruction to obtain the second metadata and second instruction information. In some instances, tag processing hardware 140 may obtain the first metadata using the received first instruction information. The first metadata may indicate a location of the second instruction information and the second metadata. For example, the first metadata may include at least one pointer to at least one data structure. The at least one data structure may contain the second instruction information. In some instances, the tag processing hardware 140 may be configured to use the second instruction information to obtain the second metadata. In various instances, the at least one data structure may contain the second metadata.

In act 530, policy engine 610 may generate update metadata using at least one of the second instruction information and second metadata. For example, the tag processing hardware 140 can be configured to use a rule cache 144 to map the second metadata to update metadata. As an additional example, policy processor 150 can be configured to generate the update metadata by applying one or more policies to the second metadata. For example, tag processing hardware 140 may query policy processor 150 for authorization to allow the first instruction. As discussed herein, the tag processing hardware 140 can be configured to maintain a rule cache. This rule cache may not include an entry for the first instruction, causing tag processing hardware 140 to query the policy processor 150 for authorization to allow the first instruction. Policy processor 150 can be configured to receive the query. In response to the query, policy processor 150 can determine the update metadata.

In some instances, policy processor 150 can be configured to provide a single-use rule that evaluates to the update metadata to tag processing hardware 140. Tag processing hardware 140 can be configured to receive that single-use rule. As the rule is single use, tag processing hardware 140 may not store the rule in the rule cache, but may evaluate the single-use rule to generate the update metadata. Alternatively, the tag processing hardware 140 may store the single-use rule in the rule cache, and be configured to remove or invalidate that rule from the rule cache when it is used.

In act 540, policy engine 610 can update a metadata storage location using the generated update metadata. In some embodiments, tag processing hardware 140 may update the metadata storage location using the generated update metadata. In various embodiments, the metadata storage location can include at least one of a tag map table, tag register file, or metadata memory. For example, tag processing hardware 140 may write new metadata to a location in the metadata memory; or create, modify, or delete one or more entries in the tag map table and/or the tag register file. In various instances, policy processor 150 can be configured to update the at least one of the tag map table, the tag register file, or the metadata memory using the generated update metadata. For example, policy processor 150 can directly affect the state of the tag processing hardware 140 by directly updating the tag map table and/or the tag register file. As an additional example, policy processor 150 can write updated metadata to a location in metadata memory, or cause tag processing hardware 140 to write updated metadata to the location in metadata memory by directly changing memory or register values in tag processing hardware 140.

In some embodiments, the update metadata concerns a security routine. For example, the security routine may effectuate software-defined privileges modes by changing security privileges in response to system calls and/or non-system function calls. For example, when a system call occurs, the update metadata may enact a higher privilege level appropriate for a system call. Once the system call ends, the update metadata may enact a return to a lower privilege level appropriate for a user. These changes in privilege level may be implemented by updating the at least one of the tag map table, tag register file, or metadata memory using the generated update metadata.

In various embodiments, policy engine 610 may implement a stack policy. This stack policy may specify read-only access to certain locations in the call stack during a function call. For example, instructions associated with a body of a function may have read-only access during the function call to locations in the call stack containing values generated by calling conventions for the function (e.g., the function prologue and function epilogue). Policy engine 610 may implement this policy by labeling the function prologue and function epilogue with a metadata tag (e.g., a label of "frame") during the function call. Policy engine 610 may be configure to refuse writes or destructive reads targeting memory locations associated with this metadata tag during the function call. When a first instruction indicates completion of the call to the function, metadata associated with the first instruction may direct policy engine 610 to obtain at least one second instruction information and second metadata, wherein the at least one second instruction information and second metadata causes the policy engine 610 to remove metadata marking addresses as read-only from the location in the call stack. This update may disassociate the metadata tag from the locations previously containing the function prologue and function epilogue.

In act 550, policy engine 610 can be configured to determine whether subsequently executed instructions are allowable according to policies based on the updated policy metadata. In some instances, once the metadata has been updated in act 540, policy engine 610 may automatically rely on the updated metadata when making subsequent allowability determinations. In act 560, when indicated, policy engine 610 can provide an indication to interlock 112 to release the results of such subsequently executed and allowed instructions.

Illustrative Computer

Figure 7:
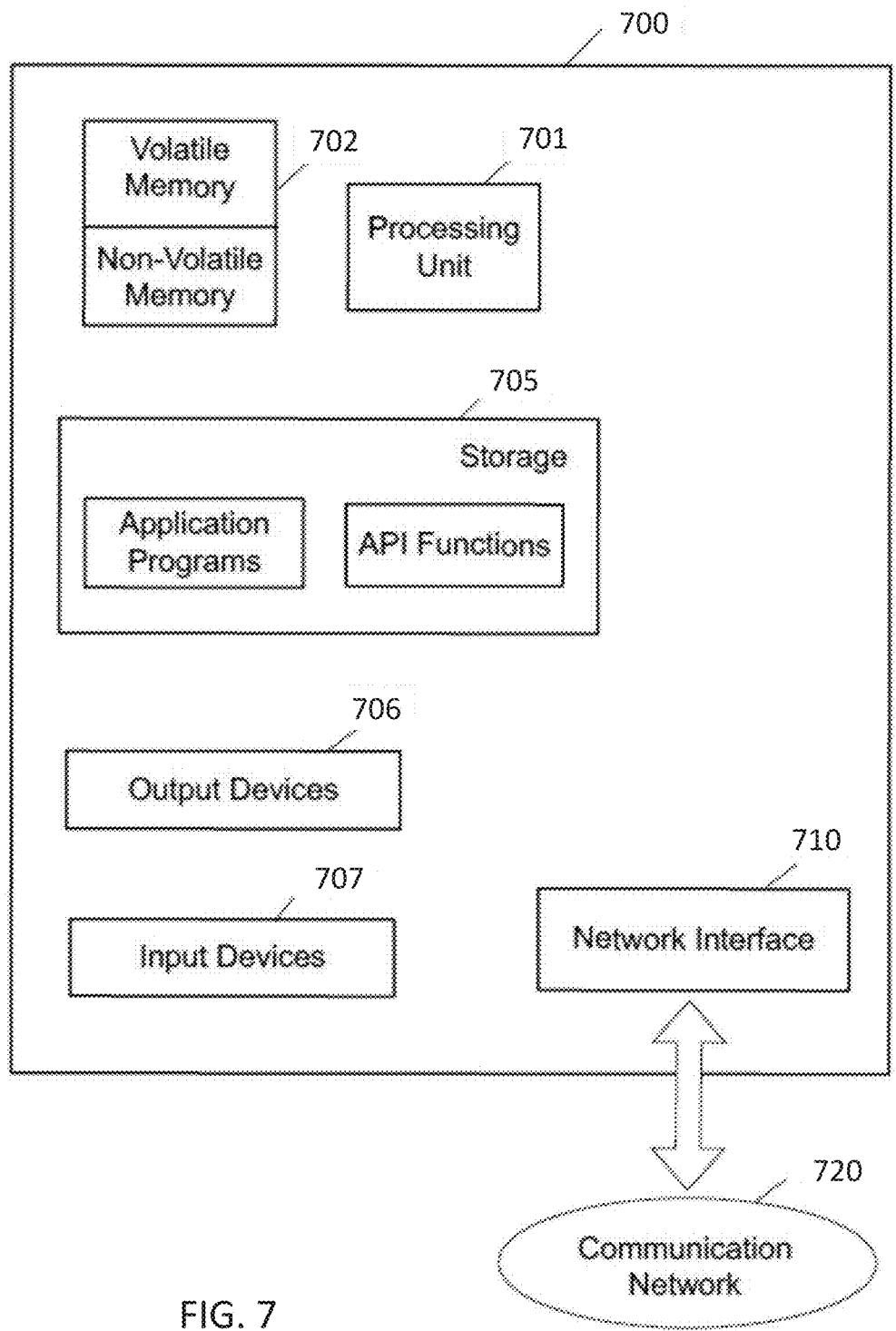
FIG. 7 shows, schematically, an illustrative computer 700 on which any aspect of the present disclosure may be implemented.

FIG. 7 shows, schematically, an illustrative computer 700 on which any aspect of the present disclosure may be implemented.

In the embodiment shown in FIG. 7, the computer 700 includes a processing unit 701 having one or more processors and a non-transitory computer-readable storage medium 702 that may include, for example, volatile and/or non-volatile memory. The memory 702 may store one or more instructions to program the processing unit 701 to perform any of the functions described herein. The computer 700 may also include other types of non-transitory computer-readable medium, such as storage 705 (e.g., one or more disk drives) in addition to the system memory 702. The storage 705 may also store one or more application programs and/or resources used by application programs (e.g., software libraries), which may be loaded into the memory 702.

The computer 700 may have one or more input devices and/or output devices, such as devices 706 and 707 illustrated in FIG. 7. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 707 may include a microphone for capturing audio signals, and the output devices 706 may include a display screen for visually rendering, and/or a speaker for audibly rendering, recognized text.

In the example shown in FIG. 7, the computer 700 also includes one or more network interfaces (e.g., the network interface 710) to enable communication via various networks (e.g., the network 720). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Furthermore, the present technology can be embodied in the following configurations:

(1) A system, comprising a policy engine configured to receive first instruction information associated with at least one first instruction executed by a host processor; transform the first instruction information into second instruction information associated with at least one second instruction; determine, using second metadata corresponding to the at least one second instruction, whether the at least one first instruction is allowable according to a policy.

(2) The system of (1), wherein policy engine is further configured to provide, in response to determining that the at least one first instruction is allowable to an interlock, an indication to release a queued result of executing the at least one first instruction.

(3) The system of (1) or (2), wherein transforming the first instruction information into second instruction information comprises: obtaining first metadata associated with the at least one first instruction using the first instruction information; obtaining, using the first metadata, instruction information and metadata for a plurality of instructions, the plurality of instructions equivalent to the at least one first instruction; and wherein the second metadata comprises metadata for the plurality of instructions.

(4) The system of (3), wherein the first metadata comprises at least one pointer to at least one data structure comprising the instruction information for the plurality of instructions; and the metadata for the plurality of instructions.

(5) The system of (3) or (4), wherein the plurality of instructions is equivalent to the at least one first instruction when the at least one first instruction is convertible into the plurality of instructions.

(6) The system of (3) or (4), wherein the plurality of instructions is equivalent to the at least one first instruction when a first execution of the at least one first instruction and a second execution of the plurality of instructions have the same input-output behavior.

(7) The system of (3) or (4), wherein the plurality of instructions is equivalent to the at least one first instruction when a first execution of the at least one first instruction and a second execution of the plurality of instructions affect the values of the same entities and/or memory locations.

(8) The system of any of (1) to (7), wherein the at least one first instruction comprises a first branch instruction; and the at least one second instruction comprises an instruction path including the first branch instruction.

(9) The system of any of (1) to (7), wherein the at least one first instruction comprises a first branch instruction; and the at least one second instruction comprises a set of instructions that omits one or more instructions in the instruction path; and/or replaces one or more instructions in the instruction path corresponding to a single operation with an instruction representing the operation.

(10) A system comprising a policy engine configured to receive first instruction information associated with at least one first instruction executed by a host processor; in response to receiving the first instruction information obtain: second instruction information associated with at least one second instruction; and second metadata associated with the at least one second instruction; generate third metadata using at least one of the second instruction information or second metadata; update metadata storage location using the third metadata; and determine whether at least one instruction executed by a host processor is allowable according to at least one policy.

(11) The system of (10), wherein the metadata storage location comprises at least one of a tag map table, tag register file, or metadata memory.

(12) The system of (10) or (11), wherein the policy engine is further configured to provide, to an interlock in response to the determination, an indication to release a queued result of executing the at least one instruction.

(13) The system of any of (10) to (12), wherein the at least one first instruction is associated with a change in host processor context; and the at least one second instruction comprises a set of instructions corresponding to operations performed by the host processor when changing context.

(14) The system of (13), wherein the change in host processor context corresponds to initiation of an interrupt service routine, thread switching, exception or a system call.

(15) The system of (13) or (14), wherein the set of instructions further corresponds to a type of the host processor.

(16) The system of any of (10) to (15), wherein the policy engine comprises tag processing hardware configured to obtain first metadata using the first instruction information, the first metadata comprising at least one pointer to at least one data structure containing the second instruction information and the second metadata.

(17) The system of any of (10) to (15), wherein the policy engine comprises tag processing hardware configured to receive the first instruction information; and in response to receiving the first instruction information, query to the policy processor to validate the first instruction; and the policy engine comprises a policy processor configured to receive the query; and determine the third metadata in response to the query.

(18) The system of (17), wherein the policy processor is further configured to provide a single-use rule that evaluates to the update metadata to the tag processing hardware; and the tag processing hardware is further configured to receive the single-use rule; evaluate the single-use rule to generate the update metadata; and update the at least one of the tag map table, the tag register file, or the metadata memory using the generated update metadata.

(19) The system of (17), wherein the policy processor is further configured to update the metadata storage location.

(20) The system of any of (10) to (19), wherein the at least one second instruction comprises a inserted instruction obtained to effectuate the update of the metadata storage location.

(21) The system of (20), wherein the inserted instruction causes the at least one second instruction to semantically differ from the at least one first instruction.

(22) The system of (20) or (21), wherein the third metadata concerns a security routine; and updating the at least one of the tag map table, tag register file, or metadata memory using the generated third metadata implements the security routine.

(23) The system of (22), wherein the security routine effectuates software-defined privileges modes by changing security privileges in response to system calls and/or non-system function calls.

(24) The system of (20) or (21), wherein the policy engine implements a stack policy specifying read-only access to locations in a call stack associated with a metadata tag by instructions within a body of a function during calls to the function; a first instruction indicates completion of a call to the function; and updating the at least one of the tag map table, tag register file, or metadata memory using the generated update metadata comprises disassociating the locations in the call stack with the metadata tag.

(25) The system of (24), wherein the locations in the call stack contain data generated by calling conventions for the function.

(26) A system, comprising a policy engine configured to receive instruction information associated with a first instruction in a host Instruction Set Architecture (ISA) used by a host processor; generate a translation of the instruction information, the translation not in the host ISA; obtain metadata using an address of the first instruction; and determine, using the metadata, whether the at least one first instruction is allowable according to a policy.

(27) The system of (26), wherein the at least one of tag processing hardware or a policy processor is further configured to provide, to an interlock, an indication to provide a queued result of executing the at least one first instruction.

(28) The system of (26) or (27), wherein the translation of the instruction information is in a policy engine ISA.

(29) The system of (26) or (27), wherein generating the translation of the instruction information comprises converting the first instruction in the host ISA to a second instruction in the policy engine ISA according to a predetermined mapping.

(30) The system of (29), wherein the predetermined mapping is implemented using a field-programmable gate array or dedicated logic circuits.

(31) The system of (26) or (27), wherein generating the translation of the instruction information comprises identifying at least one data structure comprising at least one instruction in the policy engine ISA and the metadata; and the translation of the instruction information comprises the at least one instruction in a policy engine ISA.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system comprising:
   metadata processing hardware and at least one processor programed by executable instructions to process metadata, wherein the metadata processing hardware and the at least one programmed processor are configured to:
   receive first instruction information associated with at least one first instruction executed by a host processor, wherein the at least one first instruction is part of a first instruction path;
   use the first instruction information to obtain first metadata associated with the at least one first instruction;
   use the first metadata to transform the first instruction information into second instruction information, wherein:
      the second instruction information is associated a second instruction path;
      an execution of the first instruction path and an execution of the second instruction path have a same effect on one or more hardware entities and one or more memory locations; and the second instruction path represents fewer operations than the first instruction path; and use second metadata associated with the second instruction information to determine whether the at least one first instruction is allowable for execution according to at least one policy; and in response to determining that the at least one first instruction is allowable, provide, to an interlock, an indication to release a queued result of executing the at least one first instruction for use by the system.

2. The system of claim 1, wherein the metadata processing hardware and the at least one programmed processor are further configured to:
   use the first metadata to obtain the second metadata used to determine whether the at least one first instruction is allowable.

3. The system of claim 2, wherein:
   the first metadata comprises at least one pointer to at least one data structure comprising:
      the second instruction information; and
      the second metadata associated with the second instruction information.

4. The system of claim 1, wherein:
   the first instruction path is convertible into the second instruction path.

5. The system of claim 1, wherein:
   the execution of the first instruction path and the execution of the second instruction path have a same input-output behavior.

6. The system of claim 1, wherein:
   the at least one first instruction comprises a branch instruction that is part of the first instruction path; and
   the second instruction path comprises:
      a result of removing one or more instructions from the first instruction path; and a result of replacing the one or more instructions in the first instruction path with one or more other instructions, wherein the one or more instructions and the one or more other instructions represent a same operation.

7. The system of claim 1, wherein the metadata processing hardware and the at least one programmed processor are further configured to:
   determine third metadata using the second instruction information and the second metadata; and
   update at least one metadata storage location using the third metadata.

8. The system of claim 7, wherein:
   the at least one metadata storage location comprises at least one location selected from a group consisting of: a tag map table location, a hardware register location, and a metadata memory location.

9. The system of claim 7, wherein:
   the metadata processing hardware is configured to:
      receive the first instruction information; and
      in response to receiving the first instruction information, query the at least one programmed processor to validate the at least one first instruction; and
   the at least one programmed processor is configured to:
      receive the query; and
      determine the third metadata in response to the query.

10. The system of claim 7, wherein:
    the at least one programmed processor is configured to:
       provide, to the metadata processing hardware, at least one rule for use in determining the third metadata; and
    the metadata processing hardware is configured to:
       receive the at least one rule;
       evaluate the at least one rule to determine the third metadata; and
       update the at least one metadata storage location using the third metadata.

11. The system of claim 9, wherein:
    the at least one programmed processor is further configured to:
       update the at least one metadata storage location using the third metadata.

12. The system of claim 7, wherein:
    the second instruction path comprises an inserted instruction to effectuate updating the at least one metadata storage location.

13. The system of claim 7, wherein:
    the metadata processing hardware and the at least one programmed processor are configured to implement a stack policy indicating read-only access, by one or more instructions within a body of a function during a call to the function, to one or more locations in a call stack associated with a metadata tag;
    the at least one first instruction indicates completion of a call to the function; and
    updating the at least one metadata storage location using the third metadata results in the metadata tag being disassociated from the one or more locations in the call stack.

14. The system of claim 1, wherein:
    the at least one first instruction is in a host Instruction Set Architecture (ISA) used by the host processor;

the second instruction information comprises a translation of at least a portion of the first instruction information, the translation not in the host ISA;

the first instruction information further comprises an address of the at least one first instruction;

the second metadata is obtained using the address of the at least one first instruction.

15. The system of claim 14, wherein:

the translation of at least a portion of the first instruction information is in a policy engine ISA.

16. The system of claim 14, wherein:

the metadata processing hardware and the at least one programmed processor are further configured to generate the translation of at least a portion of the first instruction information at least in part by converting the at least one first instruction in the host ISA to at least one second instruction in a policy engine ISA according to a mapping implemented using a look-up table, a field-programmable gate array, or dedicated logic circuitry.

17. The system of claim 14, wherein:

the metadata processing hardware and the at least one programmed processor are further configured to generate the translation of at least a portion of the first instruction information at least in party by identifying at least one data structure comprising at least one instruction in a policy engine ISA, and the translation of at least a portion of the first instruction information comprises the at least one instruction in the policy engine ISA.

18. A method performed by a system comprising metadata processing hardware and at least one processor programed by executable instructions to process metadata, the method comprising:

receiving first instruction information associated with at least one first instruction executed by a host processor, wherein the at least one first instruction is part of a first instruction path;

using the first instruction information to obtain first metadata associated with the at least one first instruction;

using the first metadata to transform the first instruction information into second instruction information, wherein:

the second instruction information is associated a second instruction path;

an execution of the first instruction path and an execution of the second instruction path have a same effect on one or more hardware entities and one or more memory locations; and the second instruction path represents fewer operations than the first instruction path; and using second metadata associated with the second instruction information to determine whether the at least one first instruction is allowable for execution according to at least one policy; and in response to determining that the at least one first instruction is allowable, providing, to an interlock, an indication to release a queued result of executing the at least one first instruction for use by the system.

19. At least one non-transitory computer-readable medium having encoded thereon instructions which, when executed by at least one processor of a system, cause the at least one processor to perform an operation comprising:

receiving first instruction information associated with at least one first instruction executed by a host processor, wherein the at least one first instruction is part of a first instruction path;

using the first instruction information to obtain first metadata associated with the at least one first instruction;

using the first metadata to transform the first instruction information into second instruction information, wherein:

the second instruction information is associated a second instruction path;

an execution of the first instruction path and an execution of the second instruction path have a same effect on one or more hardware entities and one or more memory locations; and the second instruction path represents fewer operations than the first instruction path; and using second metadata associated with the second instruction information to determine whether the at least one first instruction is allowable for execution according to at least one policy; and in response to determining that the at least one first instruction is allowable, providing, to an interlock, an indication to release a queued result of executing the at least one first instruction for use by the system.

* * * * *